US011951813B2

(12) United States Patent
Kim (10) Patent No.: US 11,951,813 B2
(45) Date of Patent: Apr. 9, 2024

(54) SEALING SYSTEM FOR VEHICLE

(71) Applicants: Hyundai Motor Company, Seoul (KR); Kia Corporation, Seoul (KR)

(72) Inventor: Min Woo Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 17/464,244

(22) Filed: Sep. 1, 2021

(65) Prior Publication Data
US 2022/0314763 A1  Oct. 6, 2022

(30) Foreign Application Priority Data
Apr. 1, 2021  (KR) .................. 10-2021-0042920

(51) Int. Cl.
| *B60J 10/86* | (2016.01) |
| *B60J 10/23* | (2016.01) |
| *B60J 10/36* | (2016.01) |
| *B60J 10/80* | (2016.01) |
| *B60J 10/84* | (2016.01) |
| *B60J 5/06* | (2006.01) |

(52) U.S. Cl.
CPC .............. *B60J 10/86* (2016.02); *B60J 10/23* (2016.02); *B60J 10/36* (2016.02); *B60J 10/80* (2016.02); *B60J 10/84* (2016.02); *B60J 5/062* (2013.01); *B60Y 2200/1432* (2013.01)

(58) Field of Classification Search
CPC ... B60J 10/23; B60J 10/36; B60J 10/24; B60J 10/84; B60J 10/86
See application file for complete search history.

(56) References Cited

U.S. PATENT DOCUMENTS

| 4,015,368 | A  | * | 4/1977 | Court ................... | E06B 7/2312 |
|           |    |   |        |                          | 49/495.1 |
| 2004/0094906 | A1 | * | 5/2004 | Gentemann ............. | B60J 10/80 |
|           |    |   |        |                          | 277/645 |
| 2008/0048464 | A1 | * | 2/2008 | Ksiezopolski ........... | B60P 3/34 |
|           |    |   |        |                          | 296/26.01 |
| 2009/0039672 | A1 | * | 2/2009 | Kubo ..................... | B60J 10/235 |
|           |    |   |        |                          | 264/279 |
| 2016/0144698 | A1 | * | 5/2016 | Inai ........................ | B60J 10/36 |
|           |    |   |        |                          | 49/495.1 |
| 2019/0255923 | A1 | * | 8/2019 | Salles ..................... | B60Q 1/324 |
| 2020/0190897 | A1 | * | 6/2020 | Grein ..................... | E06B 7/2312 |

(Continued)

FOREIGN PATENT DOCUMENTS

| DE | 3642470 A | * | 6/1988 | .............. B60J 10/24 |
| DE | 10157001 C1 | * | 10/2003 | .............. B60J 10/24 |
| EP | 17320 A | * | 10/1980 | .............. B60J 10/16 |

(Continued)

*Primary Examiner* — Marcus Menezes
(74) *Attorney, Agent, or Firm* — Fox Rothschild LLP (57) ABSTRACT

A sealing system for a vehicle includes: a mounting member including a web, and a first flange and a second flange extending opposite to each other from the web; and a sealing member including a sealing body, and a first engaging portion and a second engaging portion integrally connected to the sealing body, where the first engaging portion and the second engaging portion oppose each other in relation to the web, the first engaging portion is elastically engaged with the first flange, and the second engaging portion is elastically engaged with the second flange.

5 Claims, 6 Drawing Sheets

(56) References Cited

U.S. PATENT DOCUMENTS

2021/0237549 A1\* 8/2021 Park .................. B60J 10/86
2022/0048372 A1\* 2/2022 Bramauer ............. B60J 10/40

FOREIGN PATENT DOCUMENTS

| EP | 421316 A | \* | 4/1991 | ............. B60J 10/24 |
|----|----------|---|--------|--------------------------|
| GB | 2145142 A | \* | 3/1985 | ............. B60J 10/17 |
| GB | 2333796 A | \* | 8/1999 | ......... B29C 47/0023 |
| JP | 2001080365 A | \* | 3/2001 | ............. B60J 10/24 |
| KR | 1999-0022991 U | | 7/1999 | |
| KR | 100361285 B1 | | 11/2002 | |

\* cited by examiner

SEALING SYSTEM FOR VEHICLE

CROSS-REFERENCE TO RELATED APPLICATION

This application claims under 35 U.S.C. § 119(a) the benefit of Korean Patent Application No. 10-2021-0042920, filed on Apr. 1, 2021 in the Korean Intellectual Property Office, the entire contents of which are incorporated by reference herein.

BACKGROUND

(a) Technical Field

The present disclosure relates to a sealing system for a vehicle, more particularly, to the sealing system designed for simple and easy mounting of a sealing member such as a weatherstrip.

(b) Description of the Related Art

A vehicle includes a vehicle door for covering or uncovering a door opening of a vehicle body. In addition, the vehicle includes a sealing structure for the vehicle door in order to create a seal between the vehicle door and the door opening of the vehicle body.

A sealing system for a vehicle includes a door-side weatherstrip mounted on edges of the vehicle door, and a body-side weatherstrip attached to the vehicle body around the door opening. When the vehicle door closes the door opening of the vehicle body, the door-side weatherstrip tightly contacts the vehicle body to create a seal between the vehicle body and the vehicle door, and the body-side weatherstrip tightly contacts the vehicle door to create a seal between the vehicle door and the vehicle body.

Typically, a bus includes a folding door which moves between an unfolded position in which the folding door covers the door opening and a folded position in which the folding door uncovers the door opening. The door-side weatherstrip may be press-fit into an edge of the folding door, and the body-side weatherstrip may be press-fit into the vehicle body around the door opening. For example, a flange may be provided on the edge of the folding door, and the door-side weatherstrip may be press-fit into the flange of the folding door using a tool such as a screwdriver, soapy water, and/or the like. A bracket may be joined to the vehicle body around the door opening by using fasteners, welding, and/or the like, and the body-side weatherstrip may be press-fit into the bracket of the vehicle body.

As a conventional weatherstrip is press-fit into the vehicle door or the vehicle body, the assembly time may be excessively long, and scratches may occur on a panel of the vehicle door due to the tool such as a screwdriver used by an operator during assembly of the weatherstrip.

In addition, it is difficult to fix the conventional weatherstrip to the vehicle door or the vehicle body through fasteners and/or the like, so the weatherstrip may sag or be partially detached from the vehicle door or the vehicle body due to frequent opening and closing of the vehicle door.

The above information described in this background section is provided to assist in understanding the background of the inventive concept, and may include any technical concept which is not considered as the prior art that is already known to those skilled in the art.

SUMMARY

An aspect of the present disclosure provides a sealing system for a vehicle designed for simple and easy assembly of a sealing member such as a weatherstrip with respect to a vehicle door and/or a vehicle body.

According to an aspect of the present disclosure, a sealing system for a vehicle may include: a mounting member including a web, and a first flange and a second flange extending opposite to each other from the web; and a sealing member including a sealing body, and a first engaging portion and a second engaging portion integrally connected to the sealing body. The first engaging portion and the second engaging portion may oppose each other in relation to the web, the first engaging portion may be elastically engaged with the first flange, and the second engaging portion may be elastically engaged with the second flange.

The first engaging portion may be integrally connected to the sealing body through a first connection portion that is elastically deformable, and the second engaging portion may be integrally connected to the sealing body through a second connection portion that is elastically deformable.

The mounting member may include a first groove defined by the web and the first flange, and a second groove defined by the web and the second flange.

The first engaging portion may be elastically inserted into the first groove, and the second engaging portion may be elastically inserted into the second groove.

The first engaging portion may have a first cavity defined therein, and the second engaging portion may have a second cavity defined therein.

The first and second engaging portions may be engaged with the web by a fastener, and the fastener may penetrate the first and second engaging portions and the web through the first and second cavities and fasten the first and second engaging portions and the web.

The sealing system may further include a protection cover for covering the first cavity and the second cavity, and the protection cover may have a first retention barb fitted into the first cavity and a second retention barb fitted into the second cavity.

The first flange may have a first retention barb protruding from an end thereof, and the first retention barb may be perpendicular to the first flange.

The mounting member may include a groove defined by the first flange, the first retention barb, and the web, and the first engaging portion may have a retention barb fitted into the groove of the mounting member.

The second flange may have a second retention barb protruding from an end thereof, and the second retention barb may have a curved shape.

The second connection portion may have a curved shape corresponding to that of the second retention barb.

The mounting member may include a retention flange provided on the web, the retention flange may extend in a curved manner from the web toward the second flange so that the retention flange may define a groove which is open to the second flange, and the second engaging portion may have a retention barb fitted into the groove of the retention flange.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this description, the term "interior" refers to a direction toward an interior space of the vehicle, and the term "exterior" refers to a direction toward an exterior space of the vehicle.

Figure 1:
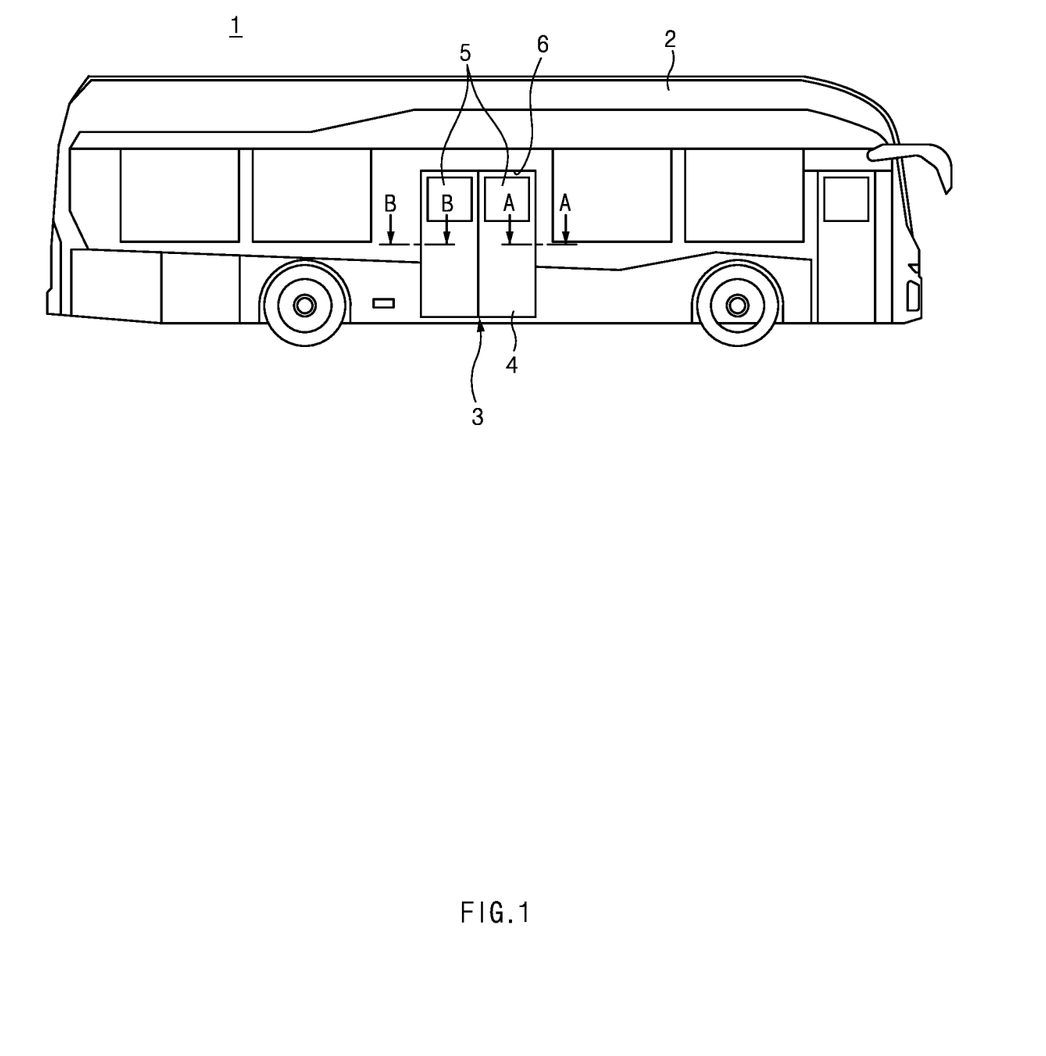
FIG. 1 illustrates a bus according to an exemplary embodiment of the present disclosure.
Figure 2:
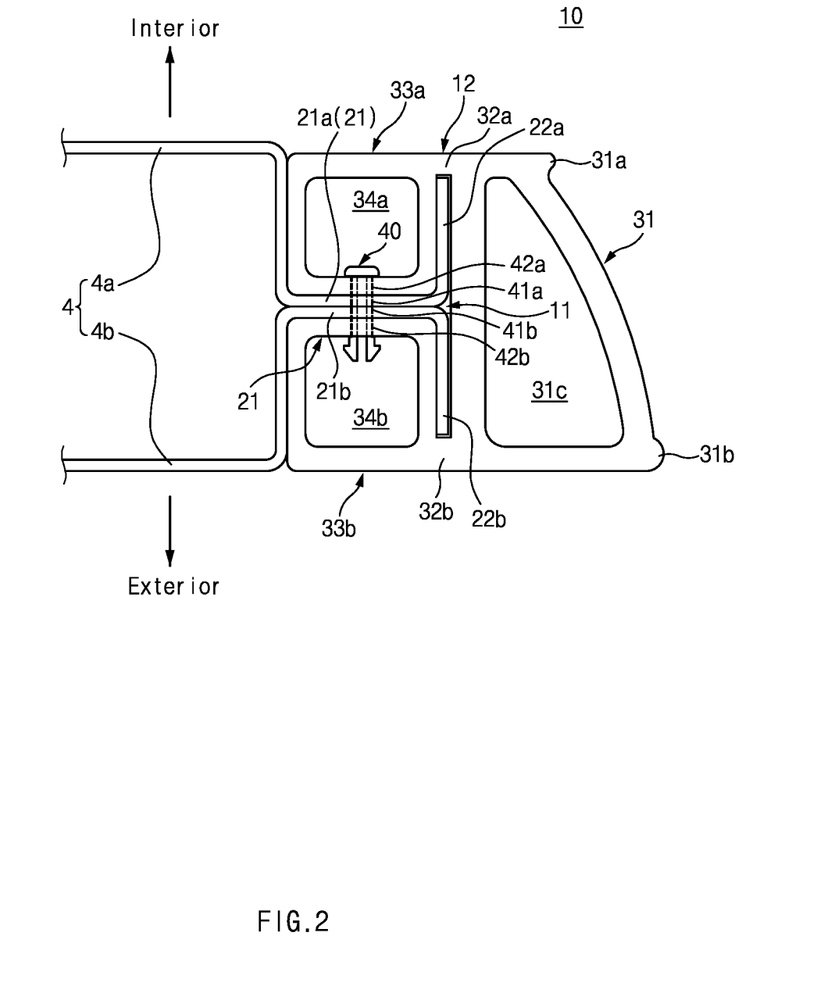
FIG. 2 illustrates a cross-sectional view of a sealing system for a vehicle according to an exemplary embodiment of the present disclosure, taken along line A-A of FIG. 1.
Figure 3:
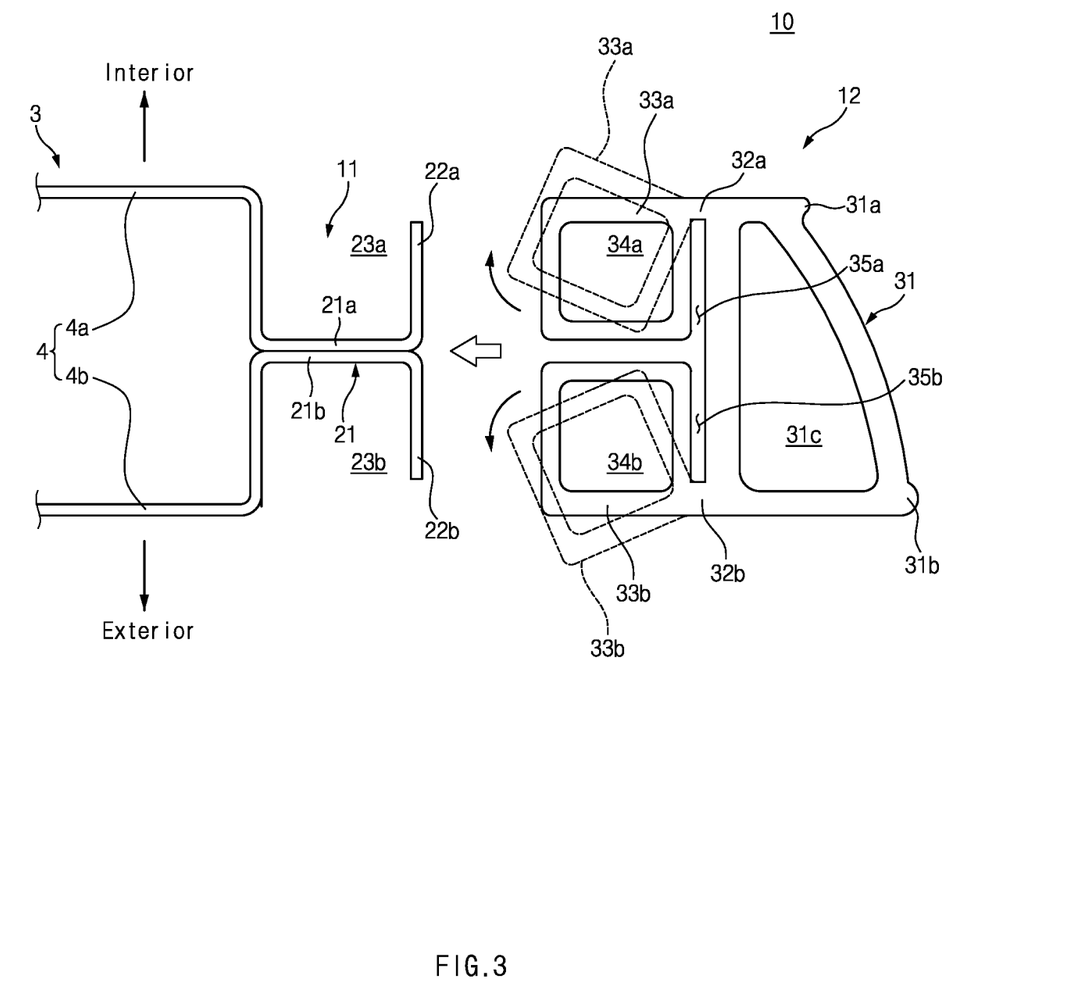
FIG. 3 illustrates a state in which a sealing member is disengaged from a mounting member in a sealing system for a vehicle according to an exemplary embodiment of the present disclosure.
Figure 4:
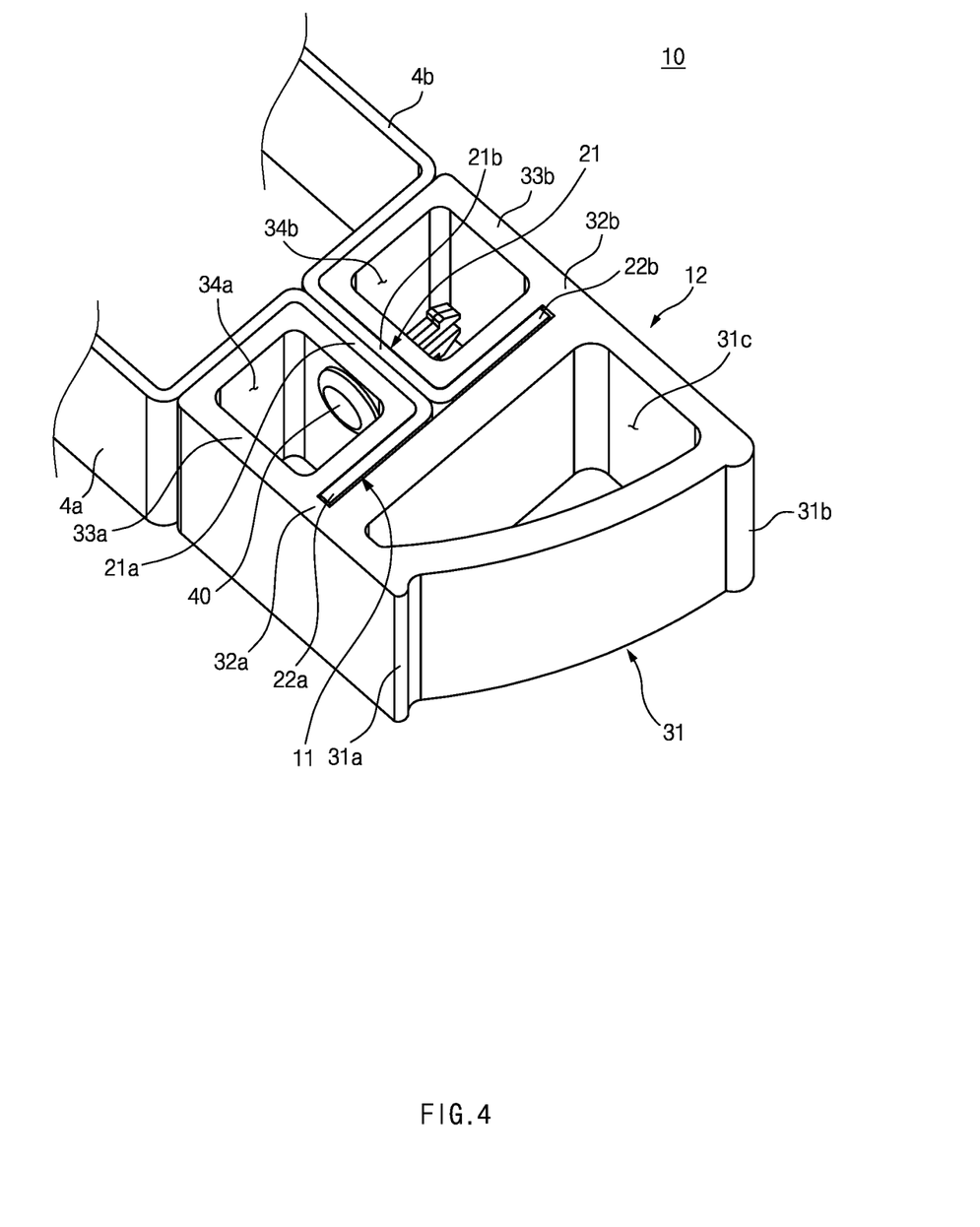
FIG. 4 illustrates a perspective view of a sealing system for a vehicle according to an exemplary embodiment of the present disclosure.

Referring to FIG. 1, a bus 1 may include a vehicle body 2 having a door opening 6, and a vehicle door 3 for covering or uncovering the door opening 6 of the vehicle body 2. The vehicle door 3 may include a door panel 4, and a glass 5 fixedly mounted to the door panel 4. Referring to FIG. 2, the door panel 4 may include an inner panel 4a facing the interior of the vehicle and an outer panel 4b facing the exterior of the vehicle, and the inner panel 4a and the outer panel 4b may be joined by using fasteners, welding, and/or the like.

For example, the vehicle door 3 may be a folding door which moves between an unfolded position in which the door covers the door opening 6 of the bus 1 and a folded position in which the door uncovers the door opening 6. As another example, the vehicle door 3 may be a swing door which swings around a hinge axis. As another example, the vehicle door 3 may be a sliding door which slides in a longitudinal direction of the vehicle body 2 of the bus 1.

Referring to FIGS. 2 to 5, a sealing system 10 for a vehicle according to an exemplary embodiment of the present disclosure may include a mounting member 11 provided on an edge of the vehicle door 3, and a sealing member 12 detachably engaged with the mounting member 11.

The mounting member 11 may be integrally connected to the door panel 4 of the vehicle door 3. The mounting member 11 may include a web 21 extending from the edge of the vehicle door 3 toward the sealing member 12, and a pair of flanges 22a and 22b extending opposite to each other from the end of the web 21. A longitudinal axis of each of the flanges 22a and 22b may be perpendicular to a longitudinal axis of the web 21. The pair of flanges 22a and 22b may be opposite to each other in relation to the web 21. That is, the mounting member 11 may have a T-shaped cross section defined by the web 21 and the pair of flanges 22a and 22b.

The web 21 may include a first half-web 21a extending from the inner panel 4a and a second half-web 21b extending from the outer panel 4b. The first half-web 21a and the second half-web 21b may extend toward the sealing member 12, and the first half-web 21a may be attached to the second half-web 21b using fasteners, welding, and/or the like.

The pair of flanges 22a and 22b may include a first flange 22a extending from an end of the first half-web 21a, and a second flange 22b extending from an end of the second half-web 21b. The first flange 22a may extend from the end of the first half-web 21a toward the interior of the vehicle, and the second flange 22b may extend from the end of the second half-web 21b toward the exterior of the vehicle.

The mounting member 11 may have a first groove 23a defined by the web 21 and the first flange 22a. The first groove 23a may be defined by an edge surface of the vehicle door 3, the first half-web 21a, and the first flange 22a, and the first groove 23a may be open to the interior of the vehicle. The mounting member 11 may have a second groove 23b defined by the web 21 and the second flange 22b. The second groove 23b may be defined by the edge surface of the vehicle door 3, the second half-web 21b, and the second flange 22b, and the second groove 23b may be open to the exterior of the vehicle. The first groove 23a and the second groove 23b may be located opposite to each other in relation to the web 21.

The sealing member 12 may include a sealing body 31, and a pair of engaging portions 33a and 33b integrally connected to the sealing body 31. The sealing member 12 may be made of an elastic material such as rubber. Thus, the sealing member 12 may be easily deformed to sufficiently achieve sealing performance between the vehicle door 3 and the vehicle body 2.

The sealing body 31 may have a plurality of seal lips 31a and 31b. The sealing body 31 may have a tube shape having a cavity 31c defined therein. When the vehicle door 3 is closed, the sealing body 31 may elastically contact the vehicle body 2 around the door opening 6.

The pair of engaging portions 33a and 33b may include a first engaging portion 33a and a second engaging portion 33b opposing each other in a width direction of the vehicle. The first engaging portion 33a may be elastically engaged with the first half-web 21a and the first flange 22a of the mounting member 11, and the second engaging portion 33b may be elastically engaged with the second half-web 21b and the second flange 22b of the mounting member 11.

The first engaging portion 33a may face the interior of the vehicle, and the first engaging portion 33a may be integrally connected to the sealing body 31 through a first connection portion 32a that is elastically deformable. The first engaging portion 33a may be spaced apart from the sealing body 31 by a first gap 35a corresponding to a length of the first connection portion 32a. As the first connection portion 32a is elastically bent, the first engaging portion 33a may be detachably engaged with the first groove 23a. The first engaging portion 33a may have a shape corresponding to that of the first groove 23a, and thus the first engaging portion 33a may be tightly and elastically inserted into the first groove 23a of the mounting member 11. In particular, the first groove 23a may be filled with the first engaging portion 33a. For example, the first groove 23a and the first engaging portion 33a may have a corresponding rectangular cross section.

According to an exemplaiy embodiment, a width of the first connection portion 32a may be less than a width of the first engaging portion 33a, making it easier to bend the first connection portion 32a elastically. In addition, the first engaging portion 33a may have a first cavity 34a defined therein, and the first engaging portion 33a may be deformed more easily due to the first cavity 34a.

The second engaging portion 33b may face the exterior of the vehicle, and the second engaging portion 33b may be integrally connected to the sealing body 31 through a second connection portion 32b that is elastically deformable. The second engaging portion 33b may be spaced apart from the sealing body 31 by a second gap 35b corresponding to a length of the second connection portion 32b. As the second connection portion 32b is elastically bent, the second engaging portion 33b may be detachably engaged with the second groove 23b. The second engaging portion 33b may have a shape corresponding to that of the second groove 23b, and thus the second engaging portion 33b may be tightly and elastically inserted into the second groove 23b of the mounting member 11. In particular, the second groove 23b may be filled with the second engaging portion 33b. For example, the second groove 23b and the second engaging portion 33b may have a corresponding rectangular cross section.

According to an exemplaiy embodiment, a width of the second connection portion 32b may be less than a width of the second engaging portion 33b, making it easier to bend the second connection portion 32b elastically. In addition, the second engaging portion 33b may have a second cavity 34b defined therein, and the second engaging portion 33b may be deformed more easily due to the second cavity 34b.

As the first engaging portion 33a and the second engaging portion 33b oppose each other in relation to the web 21, the first cavity 34a and the second cavity 34b may oppose each other in relation to the web 21.

According to an exemplary embodiment, the engaging portions 33a and 33b of the sealing member 12 may be engaged with the web 21 of the mounting member 11 by a fastener, and the fastener may penetrate the pair of engaging portions 33a and 33b and the web 21 through the pair of cavities 34a and 34b and fasten the pair of engaging portions 33a and 33b and the web 21. Referring to FIG. 2, the fastener may be a snap-fit clip 40, and the snap-fit clip 40 may be fitted into through holes 41a and 41b of the web 21 and through holes 42a and 42b of the engaging portions 33a and 33b. Specifically, the web 21 may have a first through hole 41a defined in the first half-web 21a and a second through hole 41b defined in the second half-web 21b, and the first through hole 41a may be aligned with the second through hole 41b. The first engaging portion 33a may have a third through hole 42a aligned with the first through hole 41a of the web 21, and the second engaging portion 33b may have a fourth through hole 42b aligned with the second through hole 41b of the web 21. For example, the snap-fit clip 40 may have a head and two elastic legs extending from the head, and each elastic leg may have a retention end portion. The head of the snap-fit clip 40 may be located in the first cavity 34a, and the retention end portions of the elastic legs of the snap-fit clip 40 may be located in the second cavity 34b. As the sealing member 12 is firmly engaged with the mounting member 11 by the fastener, the sealing member 12 may be prevented from sagging or being partially detached from the edge of the vehicle door 3 due to frequent opening and closing of the vehicle door 3.

Figure 5:
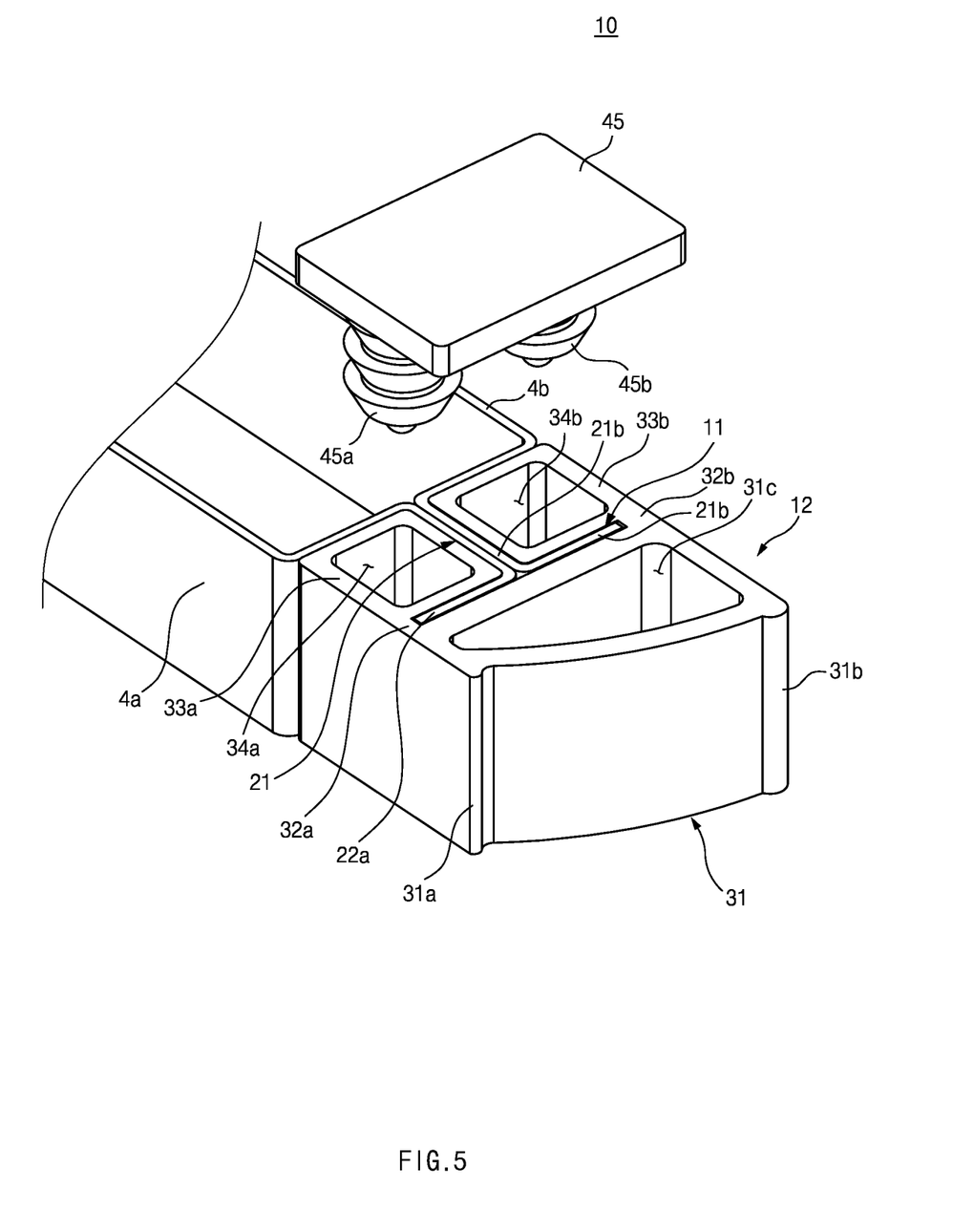
FIG. 5 illustrates a process for covering a pair of cavities with a protection cover in a sealing system for a vehicle according to an exemplary embodiment of the present disclosure.

Referring to FIG. 5, the sealing system 10 for a vehicle according to an exemplary embodiment of the present disclosure may further include a protection cover 45 for covering the first cavity 34a and the second cavity 34b of the sealing member 12. The protection cover 45 may include a first retention barb 45a inserted and fitted into the first cavity 34a and a second retention barb 45b inserted and fitted into the second cavity 34b. Thus, the protection cover 45 may prevent foreign objects from entering the cavities 34a and 34b of the sealing member 12.

Figure 6:
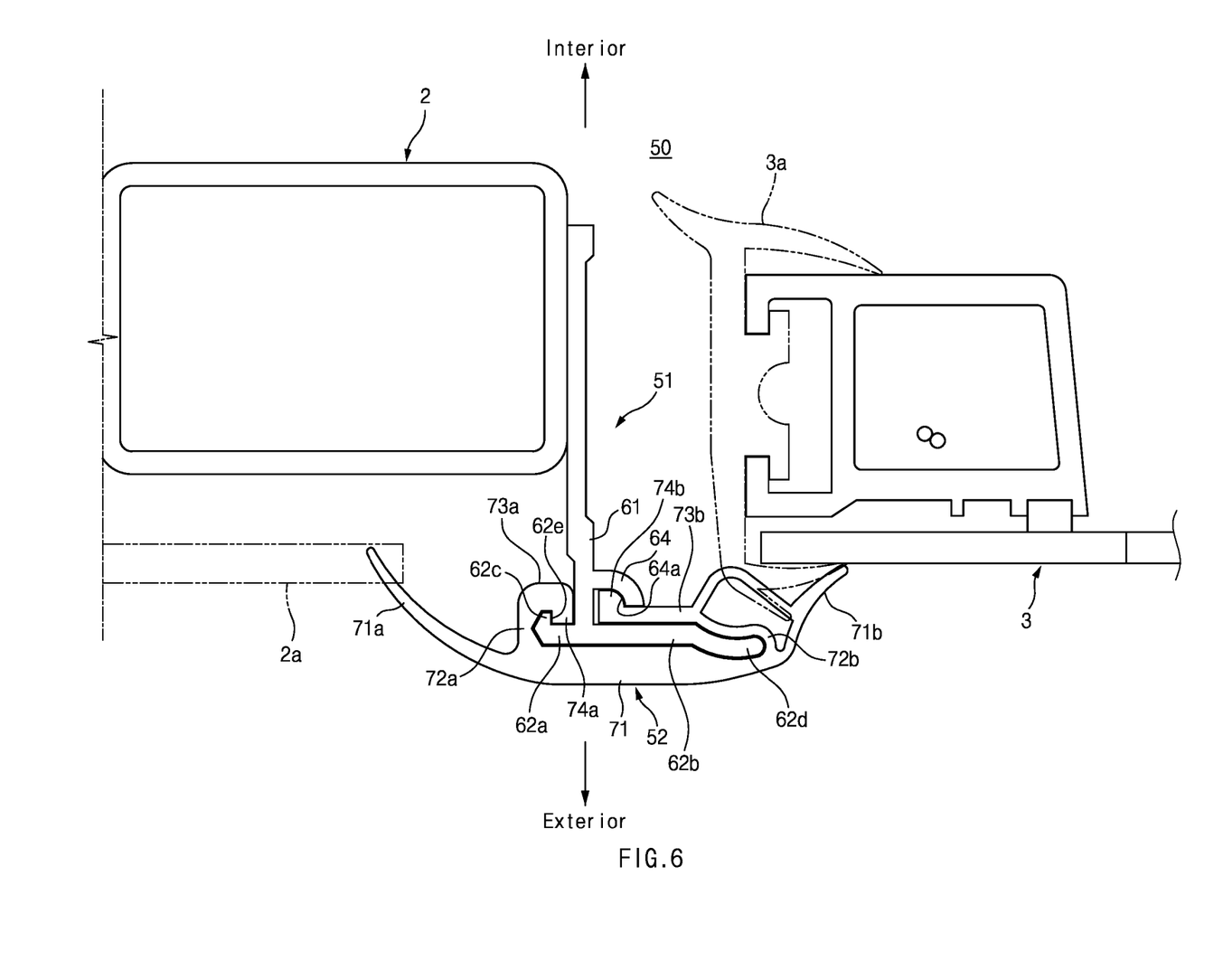
FIG. 6 illustrates a cross-sectional view of a sealing system for a vehicle according to another exemplary embodiment of the present disclosure, taken along line B-B of FIG. 1.

Referring to FIG. 6, a sealing system 50 for a vehicle according to another exemplary embodiment of the present disclosure may include a mounting member 51 provided on an edge of the vehicle body 2, and a sealing member 52 detachably engaged with the mounting member 51.

The mounting member 51 may be detachably engaged with the edge of the vehicle body 2 by fasteners (screws, rivets, etc.). The mounting member 51 may include a web 61 extending from the vehicle body 2 toward the exterior of the vehicle, and a pair of flanges 62a and 62b extending opposite to each other from the end of the web 61. That is, the mounting member 51 may have a T-shaped cross section defined by the web 61 and the pair of flanges 62a and 62b.

The web 61 may extend toward the exterior of the vehicle in the width direction of the vehicle, and each of the flanges 62 and 62b may extend in the longitudinal direction of the vehicle. The pair of flanges 62a and 62b may include a first flange 62a extending from the end of the web 61 toward the vehicle body 2, and a second flange 62b extending from the end of the web 61 toward the vehicle door 3.

The first flange 62a may include a first retention barb 62c protruding from an end thereof toward the interior of the vehicle, and the first retention barb 62c may be perpendicular to the first flange 62a The mounting member 51 may include a groove 62e defined by the first flange 62a, the first retention barb 62c, and the web 61.

The second flange 62b may include a second retention barb 62d protruding from an end thereof toward the vehicle door 3. In particular, the second retention barb 62d may have a curved shape.

The sealing member 52 may include a sealing body 71 and a pair of engaging portions 73a and 73b integrally connected to the sealing body 71. The sealing member 52 may be made of an elastic material such as rubber. Thus, the sealing member 52 may be easily deformed to sufficiently achieve the sealing performance between the vehicle door 3 and the vehicle body 2.

The sealing body 71 may have a plurality of seal lips 71a and 71b elastically contacting the vehicle body 2 and the vehicle door 3. According to an exemplary embodiment, the plurality of seal lips 71a and 71b may include a first seal lip 71a elastically contacting the vehicle body 2 or a component (an exterior-side glass, etc.) attached to the vehicle body 2, and a second seal lip 71b elastically contacting the vehicle door 3. Referring to FIG. 6, the exterior-side glass 2a may be disposed adjacent to the vehicle body 2, and the first seal lip 71a may elastically contact the exterior-side glass 2a. A door-side seal member 3a may be mounted on the edge of the vehicle door 3, and the second seal lip 71b may elastically contact the door-side seal member 3a The pair of engaging portions 73a and 73b may include a first engaging portion 73a and a second engaging portion 73b opposing each other along the longitudinal direction of the vehicle, and the first engaging portion 73a and the second engaging portion 73b may face the interior of the vehicle.

The first engaging portion 73a may be integrally connected to the sealing body 71 through a first connection portion 72a that is elastically deformable. The first engaging portion 73a may be spaced apart from the sealing body 71 corresponding to a length of the first connection portion 72a. As the first connection portion 72a is elastically bent, the first engaging portion 73a may be detachably engaged with the first flange 62a and the first retention barb 62c of the mounting member 51.

The first engaging portion 73a may have a retention barb 74a protruding from an end thereof toward the exterior of the vehicle. As the retention barb 74a of the first engaging portion 73a is tightly and elastically fitted into the groove 62e of the mounting member 51, the first engaging portion 73a may be more firmly engaged with the first flange 62a of the mounting member 51.

The second engaging portion 73b may be integrally connected to the sealing body 71 through a second connection portion 72b that is elastically deformable. As the second connection portion 72b is elastically bent, the second engaging portion 73b may be detachably engaged with the second flange 62b of the mounting member 51. The second connection portion 72b may have a curved shape corresponding to that of the second retention barb 62d of the mounting member 51, and the second connection portion 72b may be engaged with the second retention barb 62d of the mounting member 51.

The mounting member 51 may have a retention flange 64 provided on the web 61, and the retention flange 64 may extend in a curved manner from the web 61 toward the second flange 62b, and accordingly the retention flange 64 may define a groove which is open to the second flange 62b. The second engaging portion 73b may have a retention barb 74b protruding from an end thereof toward the interior of the vehicle, and the retention barb 74b may have a curved surface corresponding to that of the retention flange 64, and thus the retention barb 74b may be tightly and elastically fitted into the groove of the retention flange 64 of the mounting member 51.

As set forth above, according to exemplary embodiments of the present disclosure, the sealing member such as a weatherstrip may be easily assembled to the mounting member provided on the vehicle door and/or the vehicle body, and thus the assembly time of the sealing member may be reduced. In addition, since there is no need to use a separate tool, damage to the vehicle door or the vehicle body may be prevented.

According to exemplary embodiments of the present disclosure, as the sealing member and the mounting member have a corresponding T-shaped cross section, the assembly structure of the sealing member may be simple, so the manufacturing cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A sealing system for a vehicle, the sealing system comprising:
 a mounting member including a web, and a first flange and a second flange extending opposite to each other from the web; and
 a sealing member including a sealing body, and a first engaging portion and a second engaging portion integrally connected to the sealing body,
 wherein the first engaging portion and the second engaging portion oppose each other in relation to the web,
 wherein the first engaging portion is elastically engaged with the first flange,
 wherein the second engaging portion is elastically engaged with the second flange;
 wherein the first engaging portion has a first cavity defined therein, and the second engaging portion has a second cavity defined therein;

wherein the first and second engaging portions are engaged with the web by a fastener; and wherein the fastener penetrates the first and second engaging portions and the web through the first and second cavities to fasten the first and second engaging portions and the web.

2. The sealing system according to claim 1, wherein the first engaging portion is integrally connected to the sealing body through a first connection portion that is elastically deformable, and the second engaging portion is integrally connected to the sealing body through a second connection portion that is elastically deformable.

3. The sealing system according to claim 1, wherein the mounting member includes a first groove defined by the web and the first flange, and a second groove defined by the web and the second flange.

4. The sealing system according to claim 3, wherein the first engaging portion is elastically inserted into the first groove, and the second engaging portion is elastically inserted into the second groove.

5. The sealing system according to claim 1, further comprising a protection cover for covering the first cavity and the second cavity, wherein the protection cover has a first retention barb fitted into the first cavity and a second retention barb fitted into the second cavity.

* * * * *